(12) United States Patent
Hu et al.

(10) Patent No.: US 12,191,986 B2
(45) Date of Patent: Jan. 7, 2025

(54) MULTIPLE PORTS WITH DIFFERENT BAUD RATE OVER A SINGLE SERDES

(71) Applicant: MAXLINEAR, INC., Carlsbad, CA (US)

(72) Inventors: Chun Feng Hu, Singapore (SG); Ingo Volkening, Singapore (SG)

(73) Assignee: MAXLINEAR, INC., Carlsbad, CA (US)

( * ) Notice: Subject to any disclaimer, the term of this patent is extended or adjusted under 35 U.S.C. 154(b) by 86 days.

(21) Appl. No.: 17/597,647

(22) PCT Filed: Jul. 23, 2020

(86) PCT No.: PCT/US2020/043164
§ 371 (c)(1),
(2) Date: Jan. 14, 2022

(87) PCT Pub. No.: WO2021/016410
PCT Pub. Date: Jan. 28, 2021

(65) Prior Publication Data
US 2022/0353001 A1    Nov. 3, 2022

Related U.S. Application Data

(60) Provisional application No. 62/878,534, filed on Jul. 25, 2019.

(51) Int. Cl.
*H04J 3/24* (2006.01)
*H04J 3/06* (2006.01)
(Continued)

(52) U.S. Cl.
CPC ............ *H04J 3/247* (2013.01); *H04J 3/0697* (2013.01); *H04J 3/1682* (2013.01); *H04L 47/6225* (2013.01);

(58) Field of Classification Search
CPC ........ H04J 3/247; H04J 3/0697; H04J 3/1682; H04L 47/6225; H04L 25/0272; H04L 25/4908; G06F 13/3625
See application file for complete search history.

(56) References Cited

U.S. PATENT DOCUMENTS 7,286,566 B1 * 10/2007 Parruck .................. H04L 49/30
370/476
7,653,069 B2 * 1/2010 Lakshmanamurthy ......
H04L 47/50
370/388
(Continued)

FOREIGN PATENT DOCUMENTS

KR    10-2008-0112093 A    12/2018
WO         2013051979 A1     4/2013

OTHER PUBLICATIONS

First Office Action in Chinese application No. 2020800672267 mailed Apr. 29, 2023.
(Continued)

*Primary Examiner* — Hoang-Chuong Q Vu
(74) *Attorney, Agent, or Firm* — Buchalter; Jason W. Croft

(57) ABSTRACT

Various examples of the present disclosure relate to a transmitter apparatus, device, method, and computer program, to a receiver apparatus, device, method, and computer program, and to corresponding source and destination devices and communication devices. The transmitter apparatus comprises a plurality of ports for data to be transmitted to a destination device, with each port being associated with a transmission data rate. The transmitter apparatus comprises processing circuitry configured to obtain data to be transmitted to the destination device via the plurality of ports. The processing circuitry is configured to multiplex the data to be transmitted to the destination device according to (Continued)

a weighted round-robin scheme to generate a multiplexed data stream. The weights of the weighted round-robin scheme are based on the transmission data rate of the respective port the data is obtained over. The processing circuitry is configured to transmit the multiplexed data stream to the destination device.

15 Claims, 9 Drawing Sheets

(51) Int. Cl.
*H04J 3/16* (2006.01)
*H04L 47/62* (2022.01)

(56) References Cited

U.S. PATENT DOCUMENTS

| | | | |
|---|---|---|---|
| 9,071,373 B2 | 6/2015 | Dove | |
| 9,425,913 B2 | 8/2016 | Yu | |
| 9,692,715 B2* | 6/2017 | Krakirian | H04L 49/3063 |
| 10,412,018 B1* | 9/2019 | Feng | H04L 47/50 |
| 2003/0103514 A1* | 6/2003 | Nam | H04L 49/9057 |
| | | | 370/429 |
| 2003/0231635 A1* | 12/2003 | Kalkunte | H04L 12/5601 |
| | | | 370/395.42 |
| 2004/0223519 A1* | 11/2004 | Oster | H04L 25/14 |
| | | | 370/536 |
| 2007/0248082 A1* | 10/2007 | Nielsen | H04L 49/201 |
| | | | 370/360 |
| 2007/0268903 A1* | 11/2007 | Nakagawa | H04L 45/745 |
| | | | 370/392 |
| 2010/0061240 A1* | 3/2010 | Sindhu | H04L 49/1515 |
| | | | 370/235 |
| 2010/0232322 A1* | 9/2010 | Umayabashi | H04L 45/00 |
| | | | 370/256 |
| 2012/0300792 A1 | 11/2012 | Patel et al. | |
| 2014/0025817 A1 | 1/2014 | Lau et al. | |
| 2014/0161135 A1 | 6/2014 | Acharya et al. | |
| 2015/0058485 A1 | 2/2015 | Chu et al. | |
| 2015/0110165 A1* | 4/2015 | Ramadoss | H04L 25/03343 |
| | | | 375/232 |
| 2015/0288442 A1 | 10/2015 | Chang | |
| 2015/0295858 A1 | 10/2015 | Chrysos et al. | |
| 2017/0005951 A1* | 1/2017 | Labonte | H04L 47/6205 |
| 2018/0076932 A1* | 3/2018 | Okada | H04L 1/0083 |
| 2019/0104088 A1* | 4/2019 | Qin | H04L 25/03885 |
| 2022/0166705 A1* | 5/2022 | Froese | H04L 43/0876 |
| 2022/0321499 A1* | 10/2022 | DiFerdinando | H04L 45/66 |

OTHER PUBLICATIONS

International Search Report and Written Opinion for PCT/US2020/043164 mailed Oct. 30, 2020.

Second Office Action for Chinese Application No. 202080067226.7, mailed Dec. 27, 2023, 15 Pages.

* cited by examiner

MULTIPLE PORTS WITH DIFFERENT BAUD RATE OVER A SINGLE SERDES

FIELD

Various examples of the present disclosure relate to a transmitter apparatus, device, method, and computer program, to a receiver apparatus, device, method, and computer program, and to corresponding source and destination devices and communication devices.

BACKGROUND

Networking devices, such as routers, gateways, or switches, may comprise various interconnected components, which communicate via an internal interconnect structure. To implement the communication between the components of the networking device, pre-defined logic blocks, such as the Universal Serial 10GE Media Independent Interface (USXGMII), may be used by the various components of the networking device.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
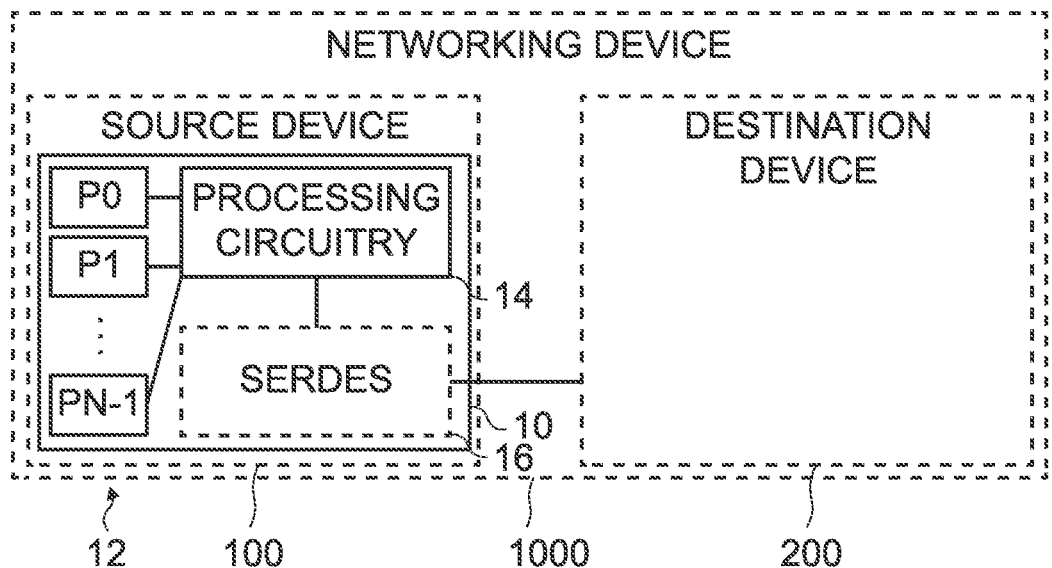
FIG. 1a shows a block diagram of an example of a transmitter apparatus or transmitter device for a source device.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

FIG. 1a shows a block diagram of an example of a transmitter apparatus 10 or transmitter device 10 for a source device 100. The components of the transmitter device 10 are defined as component means, which may be implemented by the respective structural components of the transmitter apparatus 10. The transmitter apparatus/device 10 comprises a plurality of ports 12 for data to be transmitted to a destination device 200. Each port is associated with a transmission data rate. The transmitter apparatus/device 10 (in short, the transmitter 10) comprises processing circuitry 14 or means for processing 14, which is coupled to the plurality of ports 12, and with a (optional) serializer-deserializer (short form: serdes) 16 or means for serializing and deserializing 16. The processing circuitry is configured to obtain data to be transmitted to the destination device via the plurality of ports. The processing circuitry is configured to multiplex the data to be transmitted to the destination device according to a weighted round-robin scheme to generate a multiplexed data stream. The weights of the weighted round-robin scheme are based on the transmission data rate of the respective port the data is obtained over. The processing circuitry is configured to transmit the multiplexed data stream to the destination device (e.g. via the serializer-deserializer 16 or means for serializing and deserializing 16).

FIG. 1*a* further shows an example of the source device 100 comprising the transmitter apparatus. For example, the source device 100 may be a component of a networking device, with the destination device being another component of the networking device or being separate from the networking device. FIG. 1*a* further shows the networking device 1000 comprising the source device 100 and the destination device 200. The transmitter apparatus of the source device and a receiver apparatus of the destination device may be configured to connect the source device and the destination device within the networking device. For example, the networking device may be one of a gateway, a router or an ethernet switch.

Figure 1B:
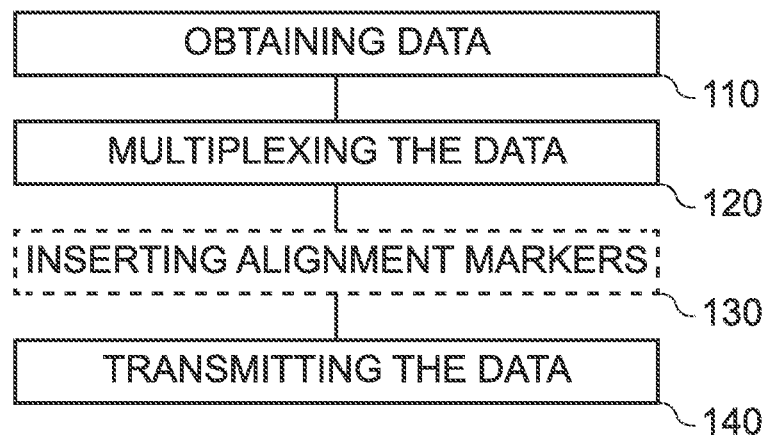
FIG. 1b shows a flow chart of an example of a transmitter method for a source device.

FIG. 1*b* shows a flow chart of an example of a corresponding transmitter method for the source device. The transmitter method comprises obtaining 110 the data to be transmitted to a destination device via the plurality of ports. The transmitter method comprises multiplexing 120 the data to be transmitted to the destination device according to the weighted round-robin scheme to generate the multiplexed data stream. The transmitter method comprises transmitting 130 the multiplexed data stream to the destination device (e.g. via the serializer-deserializer).

Various examples of the present disclosure relate to a transmitter apparatus 10, device 10, method and computer program, to a source device 100 comprising such a transmitter apparatus or being configured to perform the method or computer program, and to a networking device comprising such a source device. In the present disclosure, two types of apparatuses, devices, methods, and computer programs are presented—a transmitter type that is used by a source device, and a receiver type that is used by a destination device. The transmitter apparatus, device, method and computer program (short: transmitter) may be used to transmit data from the source device to the destination device, and the respective receiver apparatus, device method and computer program (short: receiver) may be used to receive the data at the destination device from the source device. In various examples, both types may be implemented by the same apparatus, device, method, or computer program, as many devices support both transmitting and receiving functionality. At the same time, the device, e.g. a networking device, may comprise both the source and the destination device, as the proposed approach may be used for intra-device transmission of data, e.g. in a networking device comprising two separate sets of ports being interconnected via a single serdes.

The transmitter comprises the plurality of ports 12. In the context of the present disclosure, the term "port" may refer to two concepts—the port may be a physical interface for receiving (or transmitting) signals, and it may be a logical interface for receiving or transmitting digital data. For example, each port may comprise circuitry for translating between payload data to be transmitted/received over the port and a bitstream that is provided to, or received, from transmission/reception circuitry of the respective transmitter. For example, each port may comprise circuitry for coding data into a physical coding sublayer (PCS) (e.g. the data to be transmitted to the destination device), or decoding data from the physical coding sublayer (e.g. the data received from the source device, by the ports of the destination device). The individual ports may receive or provide their respective data via signal lines and/or logical interconnects within a chip comprising the ports. For example, the processing circuitry is configured to obtain the data to be transmitted to the destination device via the plurality of ports. In various examples, the plurality of ports may be implemented as logic blocks in a semiconductor device. For example, the plurality of blocks may be generated in the design of the semiconductor, and a corresponding number of blocks may be added as logic blocks to the semiconductor device. In general, the plurality of ports comprise multiple ports, i.e. two or more ports. In various examples, plurality of ports may comprise 2, 3, 4, 5 or even more ports (depending on an overall transmission data rate of the serdes). In general, both even and uneven numbers of ports are supported, e.g. with different transmission data rate. For example, the processing circuitry may be configured to support configurations with a number of ports that is unequal to a power of two. In other words, the plurality of ports may not be limited to numbers that are a power of two.

Each port is associated with a transmission data rate. In some examples, each port may have the same transmission rate, e.g. 12 times 1 Gbit, or five times 2.5 Gbit. In some examples, however, the transmission data rates of different ports may be different. In other words, the plurality of ports may comprise at least a first subset of ports having a first transmission data rate and a second subset of ports having a second transmission data rate (with the first transmission data rate being different from the second transmission data rate). In some examples, more than two different transmission data rates may be supported at the same time. For example, the plurality of ports may comprise a third subset of ports having a third transmission data rate (being different from the first and second transmission data rates). For example, each of the plurality of ports may have one of a 100 Mbit transmission data rate, a 1 Gbit transmission data rate, a 2.5 Gbit transmission data rate, a 5 Gbit transmission data rate, a 10 Gbit transmission data rate, a 16 Gbit transmission data rate, a 25 Gbit transmission data rate, a 40 Gbit transmission data rate and a 50 Gbit transmission data rate etc. For example, the transmission data rates of the ports may be limited by the overall transmission data rate of the serdes being used to transmit the data.

The processing circuitry is configured to multiplex the data to be transmitted to the destination device according to the weighted round-robin scheme to generate a multiplexed data stream. In general, multiplexing refers to a process for making a single resource available to multiple devices. In the present context, the resource being multiplexed is time-slots in a transmission data stream to be transmitted to the destination device. The multiplexing is used to interleave data of the plurality of ports within the data stream to the destination device. In other words, the processing circuitry may be configured to multiplex the data to be transmitted into a plurality of time slots of the multiplexed data stream. For example, each time slot of the multiplexed data stream may be assigned to a port of the plurality of ports. In particular, regardless of the number of ports, each time slot of the plurality of time slots may be assigned to one of the plurality of ports. This occurs according to the weighted round-robin scheme. In other words, the time-slots within the multiplexed data stream may be assigned to the ports according to the weighting of the respective port, which may, in turn, be based on the transmission data rate of the port.

In examples of the present disclosure, a weighted round-robin scheme is used to multiplex the data to be transmitted.

In general, a round-robin scheme is a scheme in which participants take turns according to a pre-defined scheme. In a simple round-robin scheme, each participant, i.e. port in the present case, may take their turn using a resource one after another in a pre-defined order. Additionally, each turn may have the same length. In the context of the present disclosure, a weighted round-robin scheme is used. In a weighted round-robin scheme, the order, frequency and/or size or duration of the turns taken by the participants may be based on the weighting being used for the weighted round robin-scheme. For example, a participant having a larger weight may take their turn more frequently, or take longer turns than others. In the context of the present disclosure, the "turns" of the weighted round-robin scheme are time-slots being used for transmitting the data. In this case, the frequency with which a time-slot is assigned to a participant, i.e. a port, depends on the weighting of the port. In other words, the processing circuitry may be configured to multiplex the data to be transmitted into the plurality of time slots based on the weighted round-robin scheme, such that the data is multiplexed into the plurality of time slots according to the weighted round-robin scheme. Different ports may have different weights in the weighted round-robin scheme, e.g. according to their transmission data rate. Accordingly, the assignment of the time-slots may reflect the weighting of the port. In other words, a number of slots reserved for a port within a cycle of the weighted round-robin scheme may be proportional to the weighting of the respective port in the weighted round-robin scheme.

Figure 6:
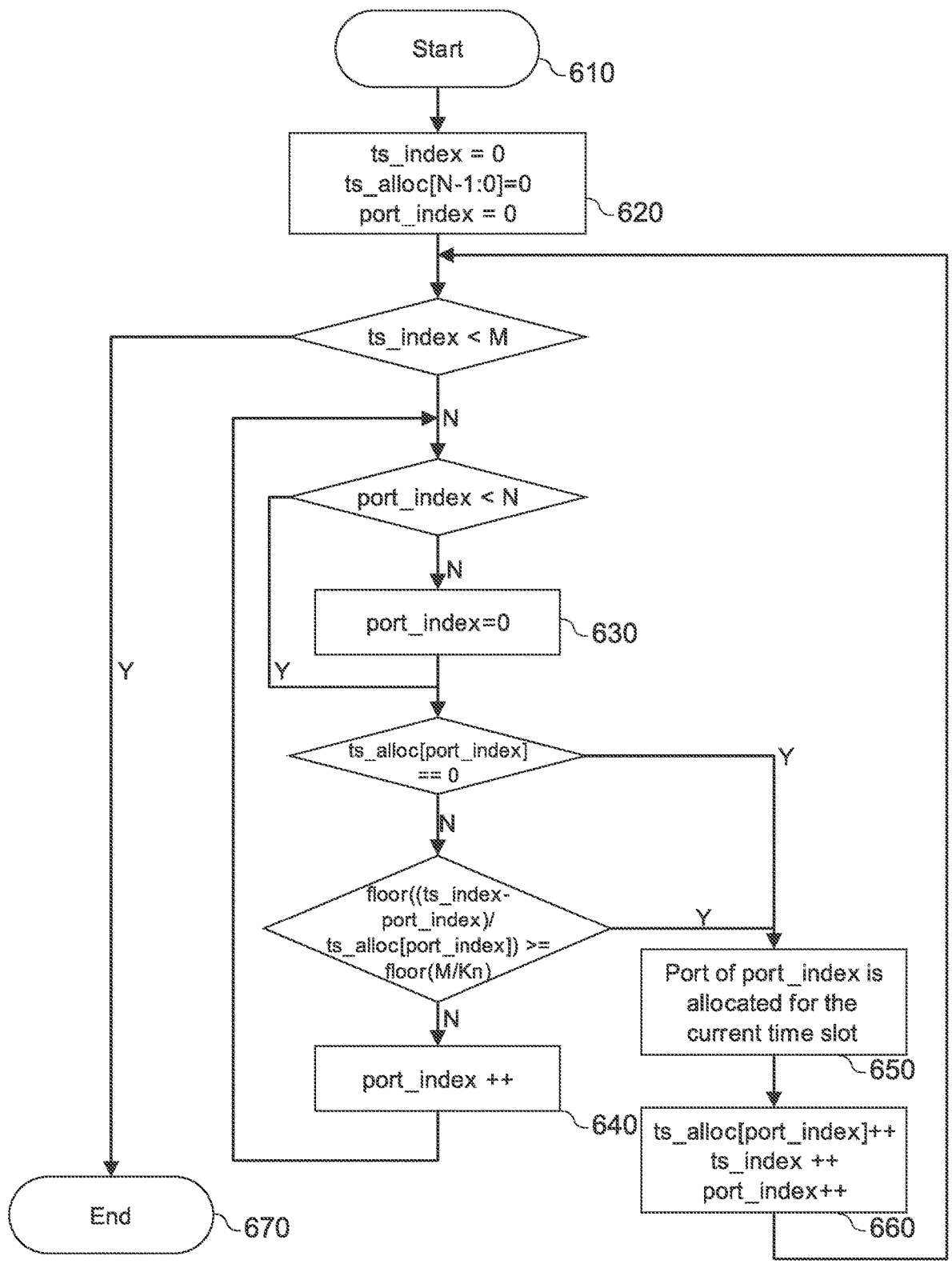
FIG. 6 shows a flow chart of an example of an algorithm for determining an assignment of time slots for the transmission of packets.

As previously mentioned, the weights of the weighted round-robin scheme are based on the transmission data rate of the respective port the data is obtained over. For example, data from a port having a higher transmission data rate may receive a higher weight in the weighted round-robin scheme than data from a port having a lower transmission data rate, e.g. to enable a fair distribution of the time-slots that avoids delays for specific ports. For example, the weights of the weighted round-robin scheme may be proportional to the transmission data rates of the plurality of ports. In consequence, the data being transmitted to the destination device may be composed such that the overall delays are kept low. In general, the number of time slots within a cycle of the weighted round-robin scheme may not be limited to the power of two. More particular, the number of time-slots may be based on the relationship between the data transmission rates of the ports, considering the slowest port as baseline. In a simple example with two ports, one being a 1 Gbps port and the other being a 5 Gbps port, the 1 Gbps port may be seen as a baseline and receive 1 time-slot per cycle, and the other port may receive five times as many time-slots per cycle (5 Gbps/1 Gbps=5 times as many time-slots). In a case with a 1 Gbps port, a 2.5 Gbps port and a 5 Gbps port, the granularity may be changes as 2.5 Gbps/1 Gbps is not an integer. Instead, if the relationship between the data transmissions rates of two ports is not an integer, another baseline may be taken, e.g. 500 Mbps. In this case, the 1 Gbps port may receive 2 time-slots, the 2.5 Gbps port may receive 5 time-slots, and the 5 Gbps slot may receive 10 time-slots. The data of the ports may be assigned to the time-slots in the weighted round-robin fashion, i.e. not only the number of time-slots reserved for the respective ports may be chosen according to the weighted round-robin scheme, but also the order of the assignment of the time-slots. In general, the individual ports may take turns in the plurality of time slots. In FIG. 6, an algorithm is shown that may be used to determine the assignment between the time-slots and the ports.

To facilitate decoding at the destination device, and to enable the destination device to identify the first port of the first cycle in a sequence of cycles of time-slots, alignment markers may be inserted into the multiplexed data stream. In other words, the processing circuitry may be configured to insert alignment markers into the multiplexed data stream after a pre-defined number of cycles of the weighted round-robin scheme. In general, the alignment markers may be one or more time-slots that are filled with pre-defined data or signal shapes that can be recognized by a decoder of the destination device.

In various examples, the data that is to be transmitted to the destination device is coded. For example, the data to be transmitted to the destination device may be coded according to a code that takes into account the physical properties of the signal traces the data is transmitted over, e.g. in order to ensure a sufficient number of state changes. Also, the coding may be chosen such, that clock recovery is possible at the destination device. In various examples of the present disclosure, so-called 64b/66b encoded data is used. In other words, the data to be transmitted to the destination device may be 64b/66b encoded data. Other codings are possible, such as 8b/10b coding or 128b/130b coding. In addition, the multiplexed data stream may be scrambled. In other words, the processing circuitry may be configured to scramble the multiplexed data stream. Scrambling is another technique that is used to obtain a data stream with advantageous physical properties on the physical layer.

The processing circuitry is configured to transmit the multiplexed data stream to the destination device. As has been mentioned above, the multiplexed data stream may be transmitted to the destination device using a serializer-deserializer. In other words, the processing circuitry may be configured to transmit the multiplexed data stream to the destination device via the serializer-deserializer. In various examples, the operation of the serdes 16 may be adjusted to the data rates of the plurality of ports. For example, an overall data rate of the serializer-deserializer may be a sum of the transmission data rates of the individual ports. In other words, the processing circuitry may be configured to operate the serializer-deserializer at a data rate that is (or at least is based on) the sum of the transmission data rates of the individual ports (plus additional overhead). In various examples, the processing circuitry may be configured to transmit the multiplexed data stream to the destination (via the serdes and) via a single line or a differential pair of lines. Other configurations are possible, e.g. multiple differential pairs, or other combinations of signal traces.

In examples, the processing circuitry or means for processing 14 may be implemented using one or more processing units, one or more processing devices, any means for processing, such as a processor, a computer or a programmable hardware component being operable with accordingly adapted software. In other words, the described function of the processing circuitry or means for processing 14 may as well be implemented in software, which is then executed on one or more programmable hardware components. Such hardware components may comprise a general-purpose processor, a Digital Signal Processor (DSP), a microcontroller, etc.

More details and aspects of the transmitter apparatus, source device or networking device are mentioned in connection with the proposed concept or one or more examples described above or below (e.g. FIG. 2a to 8). The transmitter apparatus, source device or networking device may comprise one or more additional optional features corresponding to one or more aspects of the proposed concept or one or more examples described above or below.

Figure 2A:
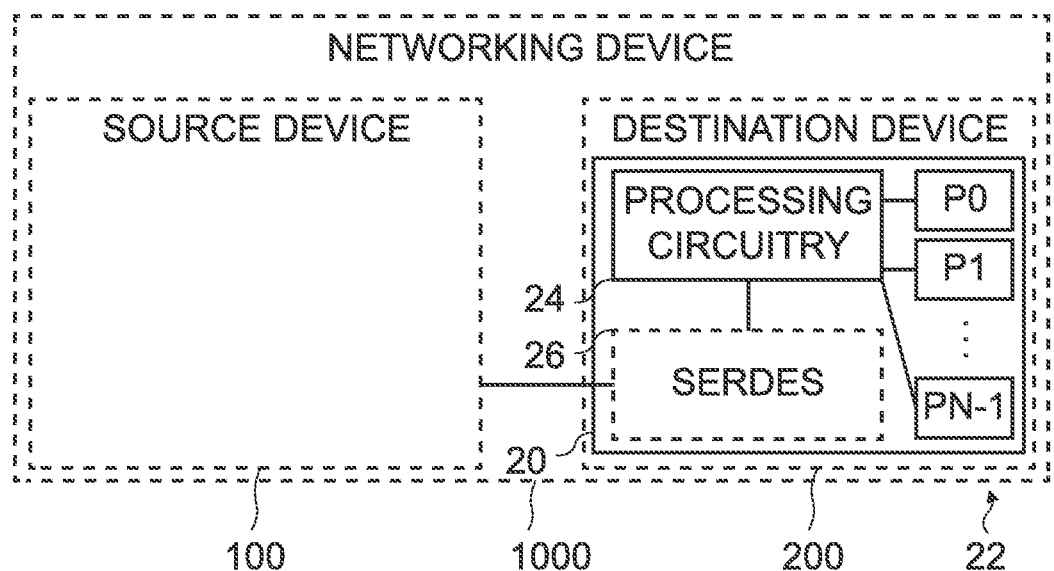
FIG. 2a shows a block diagram of an example of a receiver apparatus or receiver device for a destination device.

FIG. 2a shows a block diagram of an example of a receiver apparatus 20 or receiver device 20 for a destination device 200. The components of the receiver device 20 are defined as component means, which may be implemented by the respective structural components of the receiver apparatus 20. The receiver apparatus 20 comprises a plurality of ports 22 for outputting data that is transmitted to the destination device from a source device, with each port being associated with a transmission data rate. The receiver apparatus further comprises processing circuitry 24 (e.g. means for processing 24), which is coupled to the plurality of ports, and, to an optional serializer-deserializer 26 or means for serializing and deserializing.

The processing circuitry is configured to de-multiplex a multiplexed data stream that is received by the receiver apparatus (via the serializer-deserializer 26) from the source device. The multiplexed data stream is multiplexed according to a weighted round-robin scheme. The weights of the weighted round-robin scheme are based on the transmission data rate of the respective port the data is destined for. The processing circuitry is configured to output the de-multiplexed data over the corresponding port of the plurality of ports.

FIG. 2a further shows the destination device 200 comprising the receiver apparatus 20. FIG. 2a further shows a networking device 1000 comprising the source device 100 and the destination device 200. The transmitter apparatus of the source device and the receiver apparatus of the destination device are configured to connect the source device and the destination device within the networking device.

Figure 2B:
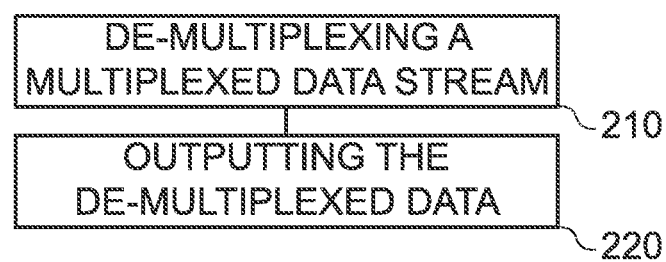
FIG. 2b shows a flow chart of an example of a receiver method for a receiver device.

FIG. 2b shows a flow chart of an example of a corresponding receiver method for the receiver device. The receiver method comprises de-multiplexing 210 the multiplexed data stream that is received by the destination device from a source device. The receiver method comprises outputting 220 the de-multiplexed data over the corresponding port of the plurality of ports.

While FIGS. 1a to 1b show examples of a transmitter apparatus, device or method for a source device, FIGS. 2a to 2b relate to a corresponding receiver apparatus, device, or method for a destination device. For example, the receiver may receive the data, e.g. the multiplexed data stream, from the transmitter, decode and process the received data, and forward the received data to the respective ports in the destination device. As mentioned in connection with FIGS. 1a to 1b, the plurality of ports may be physical and/or logical interfaces, for exchanging data between the source device and the destination device. The plurality of ports may be implemented similar to the plurality of ports of the transmitter, for example. For example, the plurality of ports may be used, on both sides, to multiplex the data transmission between the transmitter and the receiver. The plurality of ports 22 is suitable for, or configured to, outputting data that is transmitted to the destination device from a source device, with each port being associated with a transmission data rate. For example, data that is obtained via a given port of the transmitter may be output via the corresponding port of the receiver.

The multiplexed data stream is received by the destination device, e.g. by the serializer-deserializer of the destination device. The processing circuitry may be configured to obtain the multiplexed data stream from the source device, e.g. via the serializer-deserializer. For example, the processing circuitry may be configured to receive the multiplexed data stream from the source device via the serializer-deserializer.

The assignment between the data contained in the multiplexed data stream and the plurality of ports may be determined by the processing circuitry. The processing circuitry is configured to de-multiplex the multiplexed data stream that is received by the receiver apparatus from the source device. In other words, the processing circuitry may be configured to reverse the multiplexing that is applied on the multiplexed data stream (by the transmitter). The multiplexed data stream is multiplexed according to the weighted round-robin scheme (as described in connection with FIGS. 1a and/or 1b). Accordingly, the processing circuitry may be configured to de-multiplex the multiplexed data stream according to the weighted round-robin scheme. In other words, the weighted round-robing scheme being used by the transmitter may also be known by the receiver, and be used to de-multiplex the multiplexed data stream. The processing circuitry is configured to output the de-multiplexed data over the corresponding port of the plurality of ports, e.g. over the port of the plurality of ports that corresponds to the port of the plurality of ports of the transmitter that the respective data is obtained over by the transmitter.

In various examples, the multiplexed data stream comprises alignment markers, which are inserted in the multiplexed data stream after a pre-defined number of cycles of the weighted round-robin scheme. An alignment marker may indicate the beginning of a cycle of the weighted round-robin scheme. The processing circuitry may be configured to use the alignment markers to determine the beginning of cycles within the weighted round-robin scheme. The processing circuitry may be configured to use the determined beginning of the respective cycles to de-multiplex the multiplexed data stream.

As mentioned in connection with FIGS. 1a and/or 1b, the data in the multiplexed data stream may be coded and/or scrambled. Accordingly, the processing circuitry may be configured to recode the data of the multiplexed data steam, e.g. to generate 64b/66b encoded data that is output via the plurality of ports. In other word, the data that is output via the plurality of ports may be 64b/66b coded data (other codings may be used, as shown in connection with FIGS. 1a and/or 1b). The processing circuitry may be further configured to de-scramble the multiplexed data stream.

In examples, the processing circuitry or means for processing 24 may be implemented using one or more processing units, one or more processing devices, any means for processing, such as a processor, a computer or a programmable hardware component being operable with accordingly adapted software. In other words, the described function of the processing circuitry or means for processing 24 may as well be implemented in software, which is then executed on one or more programmable hardware components. Such hardware components may comprise a general-purpose processor, a Digital Signal Processor (DSP), a microcontroller, etc.

More details and aspects of the receiver apparatus, destination device or networking device are mentioned in connection with the proposed concept or one or more examples described above or below (e.g. FIG. 1a to 1b, 3 to 8). The receiver apparatus, destination device or networking device may comprise one or more additional optional features corresponding to one or more aspects of the proposed concept or one or more examples described above or below.

The present disclosure relates to a communication device comprising a transmitter and/or receiver, e.g. with a serializer-deserializer (e.g. a serdes device), and more specifically, the multiplexing multiple ports with different baud rate(s) over a single serdes. Multiple ports can be carried over the single Serdes (e.g., a Serializer/Deserializer), which can be a device or component as discussed herein between different interfaces. This disclosure also proposes a new mechanism to support multiple ports (port number == or /= power of 2) and each port at the same or different baud rate over the single Serdes to achieve improved cost and power.

In some instances, e.g. in the "Universal SXGMII PHY-MAC Interface for Multiple Network Ports" (aka UXSG-MII-M) specification, examples are shown that support multiple ports over a single SerDes (Serializer-Deserializer). In this specification, a number of ports of the Serdes is set to a power of 2. Additionally, each port has the same baud rate.

If the number of ports is not power of 2, then the higher port count (round up to power of 2) is selected. The Serdes with a high(er) rate may be used, which may incur a higher cost and more power consumption. For example, if only 5 ports are required to be carried, then 8-ports multiplexing may be selected so the bandwidth of 3 ports may be unutilized.

In some instances, every port is at the same baud rate. The port with a low(er) bit rate then is adapted to the high(er) bit rate via replication. The Serdes with the high(er) rate is to be used and this incurs the higher cost and more power consumption. For example, if there are two ports, with 2.5 Gbps and 1 Gbps, the 1 Gbps port may be replicated to 2.5 Gbps before PCS encoding and port multiplexing. So 1.5 Gbps bandwidth may remain unutilized.

In the above-referenced specification, 2, 4 or 8 network ports may be carried over a single SERDES. This may be accomplished by multiplexing the 64/66b encoded blocks of each network port in a round-robin fashion and then scrambling the multiplexed stream. At the receiver, the 64/66b encoded blocks are first descrambled and then de-multiplexed to recover the underlying network port streams. Each of these network port over USXGMII may consist of full independent PCS and MAC functionality.

Figure 3A:
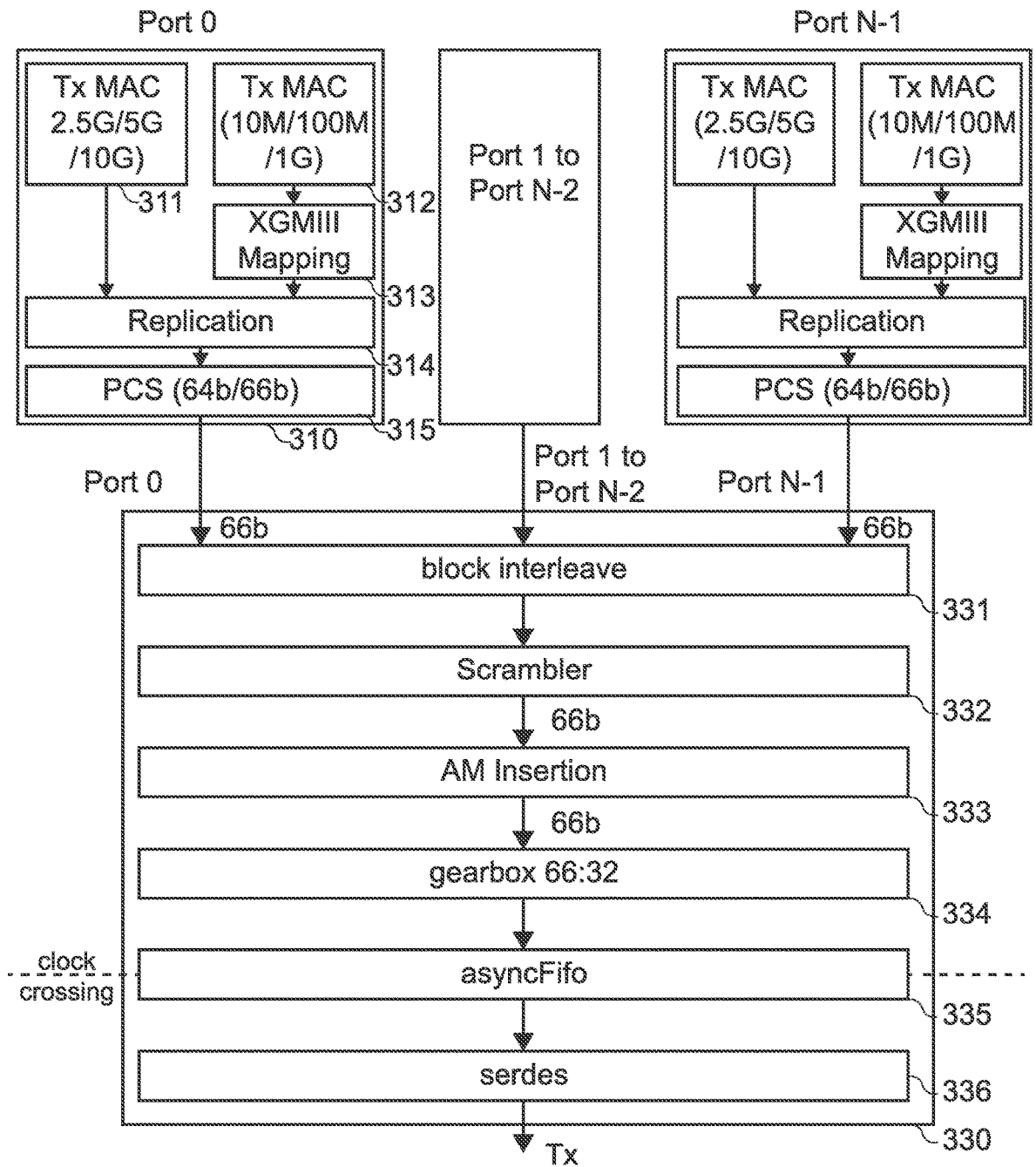
FIG. 3a shows a block diagram of an example of a multi-port transmitter device using the USXGMII standard.

FIG. 3a shows a block diagram of an example of a multi-port transmitter device using the USXGMII standard. The transmitter device comprises Ports 0 to N−1, with each port 310 comprising a Tx (Transmission) Medium Access Control (MAC) block 311 for 2.5 G/5 G/10 G (G meaning Gigabits), and a Tx MAC block 312 for 10 M/100 M/1 G (M meaning Megabits) with a XGMIII Mapping block 313. The port 310 comprises a replication block 314, and a PCS (Physical Coding Sublayer) (64/66b) block 315. Ports 0 to N−1 provide 66b wide data to a block interleave block 331, which provide the data to a scrambler block 332, which in turn provides 66b wide data to an Alignment Marker (AM) insertion block 333, which provides 66b wider data to a 66:32 gearbox block 334. From the gearbox, the data is provided to an asynchronous First in-First Out (FiFo) block 335, which traverses the clock crossing (between the PCS clock and the NX data rate). From there, the data is provided to the serdes 336, and provided as Tx output. Block 330 comprises blocks 331 to 336.

Figure 3B:
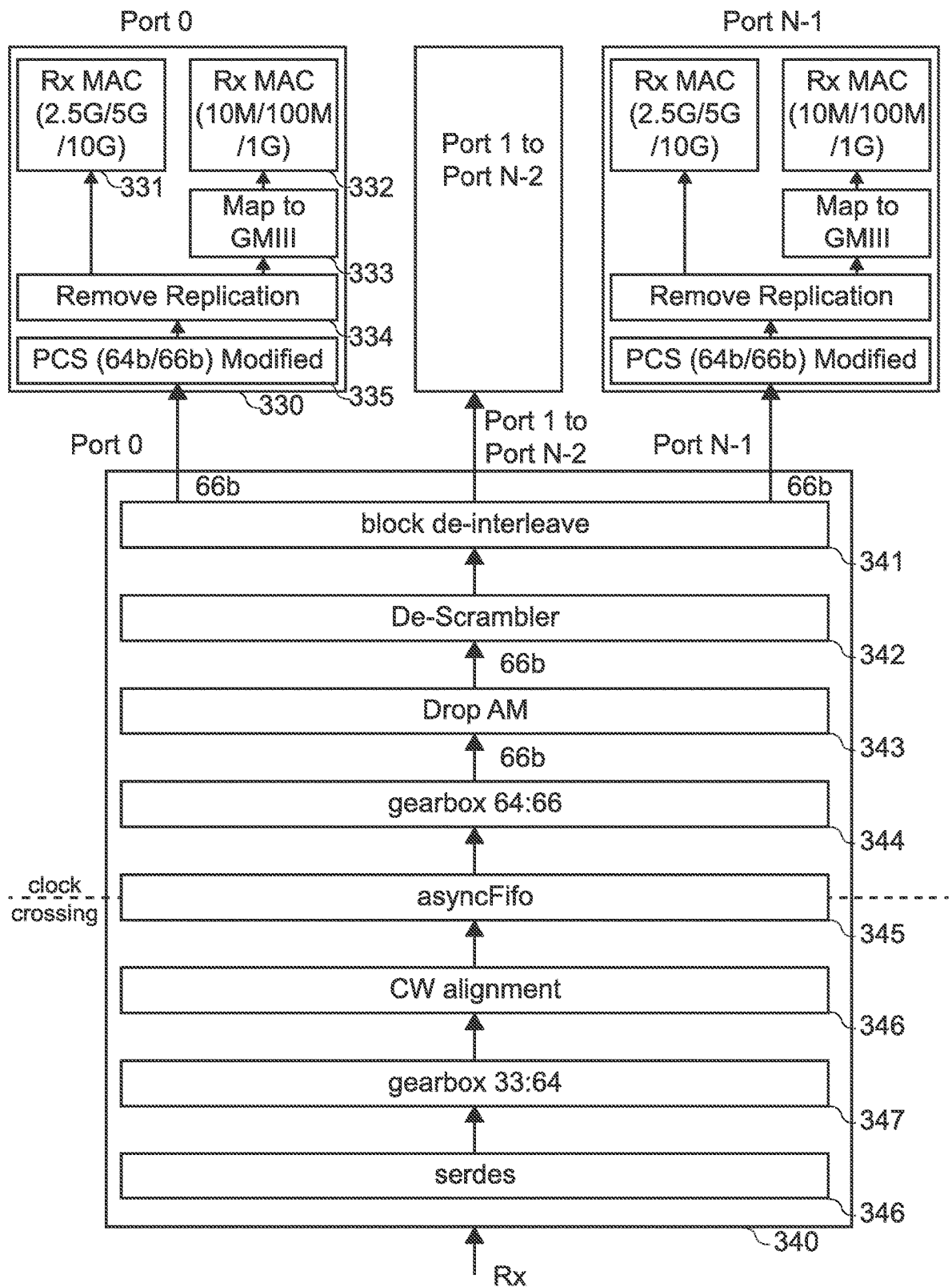
FIG. 3b shows a block diagram of an example of a multi-port receiver device using the USXGMII standard.

On the receiver side, FIG. 3b shows a block diagram of an example of a multi-port receiver device using the USXGMII standard. The Rx (Receive) data is received by serdes block 348, which provides the data to a 32:64 gearbox 347, which passes the data on to a codeword (CW) alignment block 346, which in turn inputs the data to an asynchronous FiFo 345, which traverses the clock crossing (between the NX data rate and the PCS clock). From the asynchronous FiFo, the data is provided to a 64:66 gearbox, which provides the data 66b wide to the Drop Am block 343, which provides the data 66b wide to the De-Scrambler 342, and from there to the block de-interleave block 341. Block 340 comprises blocks 341 to 348. From the block de-interleave block, the data is provided to Ports 0 to N−1, with each port comprising a PCS (64b/66b) modified block 335, a remove replication block 334, a Map to GMIII block 333 that precedes the Rx MAC (10 M/100 M/1 G) block 332, or, as another branch, a Rx MAC block (2.5 G/5 G/10 G).

Figure 4:
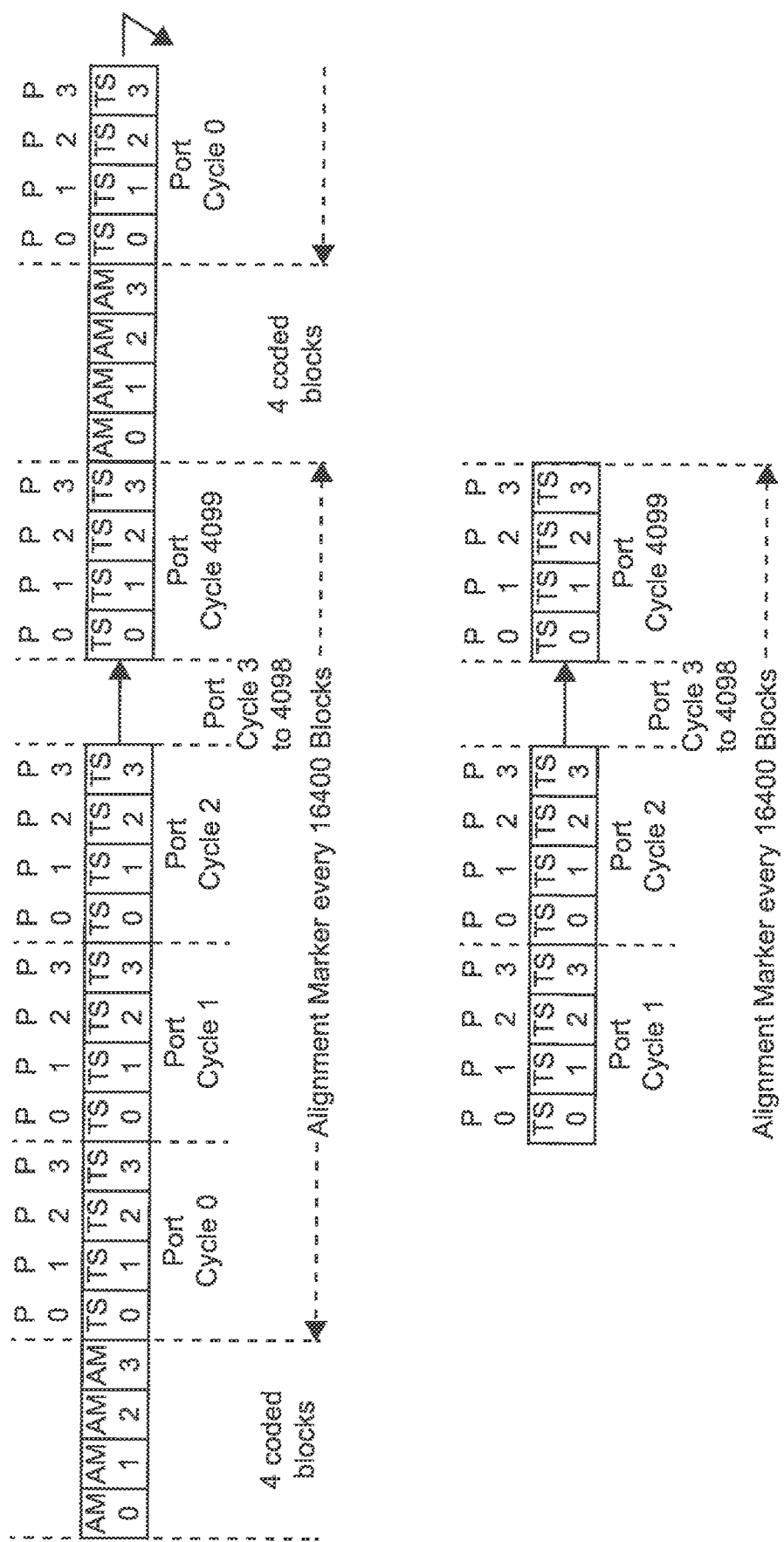
FIG. 4 shows a schematic diagram of a frame format for multi-port communication.

Port Mux/De-Mux logic may operate on 64/66b encoded blocks and the Alignment Marker may be inserted to identify port0/Port Cycle 0. The frame format with 4 ports is shown in FIG. 4. In each port cycle, there are N time slots (N=number of ports, one time slot per port) TS0-TS4, with TS0 being assigned to Port 0 (P0), TS1 to P1 etc. For every L port cycles, alignment marker is inserted. There are L*N time slots between two alignment markers (4100 port cycles, with four blocks/time slots each, resulting in an AM every 16400 blocks in FIG. 4). The AM comprises four coded blocks AM0-AM3.

Various examples of the present disclosure define a new mechanism to support multiple ports (port number == or /= power of 2) and each port at same or different baud rate over the single Serdes to achieve the improved cost and power. This may be accomplished by multiplexing the 64/66b encoded blocks of each network port in a weighted round-robin fashion and then scrambling the multiplexed stream. At the receiver, the 64/66b encoded blocks may be first descrambled and then de-multiplexed to recover the underlying network port streams.

The weight (the time slot assigned for each port) in the weighted round-robin multiplexing may be proportional to the port rate. The total number of time slots for all network ports are not limited to power of 2.

The Port Mux/De-Mux (Port Multiplex/De-Multiplex) logic may e.g. operate on 64/66b encoded blocks (other encodings may be used) and the Alignment Marker may be inserted to identify Port Cycle 0 and the start of weighted round-robin sequence. The proposed mechanism may enable a number of ports that can be any number, not limited to the power of 2. Additionally or alternatively, the baud rate of each port may be different. The mechanism may improve cost and power consumption for the systems with odd number of ports and different port rates. For example, the following cases are supported with the proposed mechanism. The proposed mechanism may support 5 ports with 2.5 Gbps each in the Serdes with 12.5 Gbps bandwidth. Additionally or alternatively, the proposed mechanism may support 2 ports, one 10 Gbps and the other 2.5 Gbps in the Serdes with 12.5 Gbps bandwidth.

In various examples of the present disclosure, the following multiple port multiplexing mechanism is proposed. In the following, there are N ports to be multiplexed. The Serdes rate may be the sum of the rates of all ports. Each port may have a different rate. Time slots may be created according to the number of ports N and the port rate of each port. The time slots assigned for a port (Kn) may be proportional to the port rate. The total number of time slots (M) may be equal to the sum of the time slots of all the ports.

In some examples, each time slot may send a 64-bit encoded block in a weighted round-robin scheme. The time slot assigned for one port may be evenly spread in the weighed round-robin list. A port cycle may be a group of time slots that repeats itself periodically. The number of port cycles (L) between consecutive Alignment Markers may be an integer value. M may be selected to make sure L*M is an integer of 5. For example, L*M may be around 16400. Alignment Markers may identify time slot 0 (start of the weighed robin sequence) and port cycle 0. Alignment markers may be inserted every L*M time slots (one encoded block per time slot).

Figure 5:
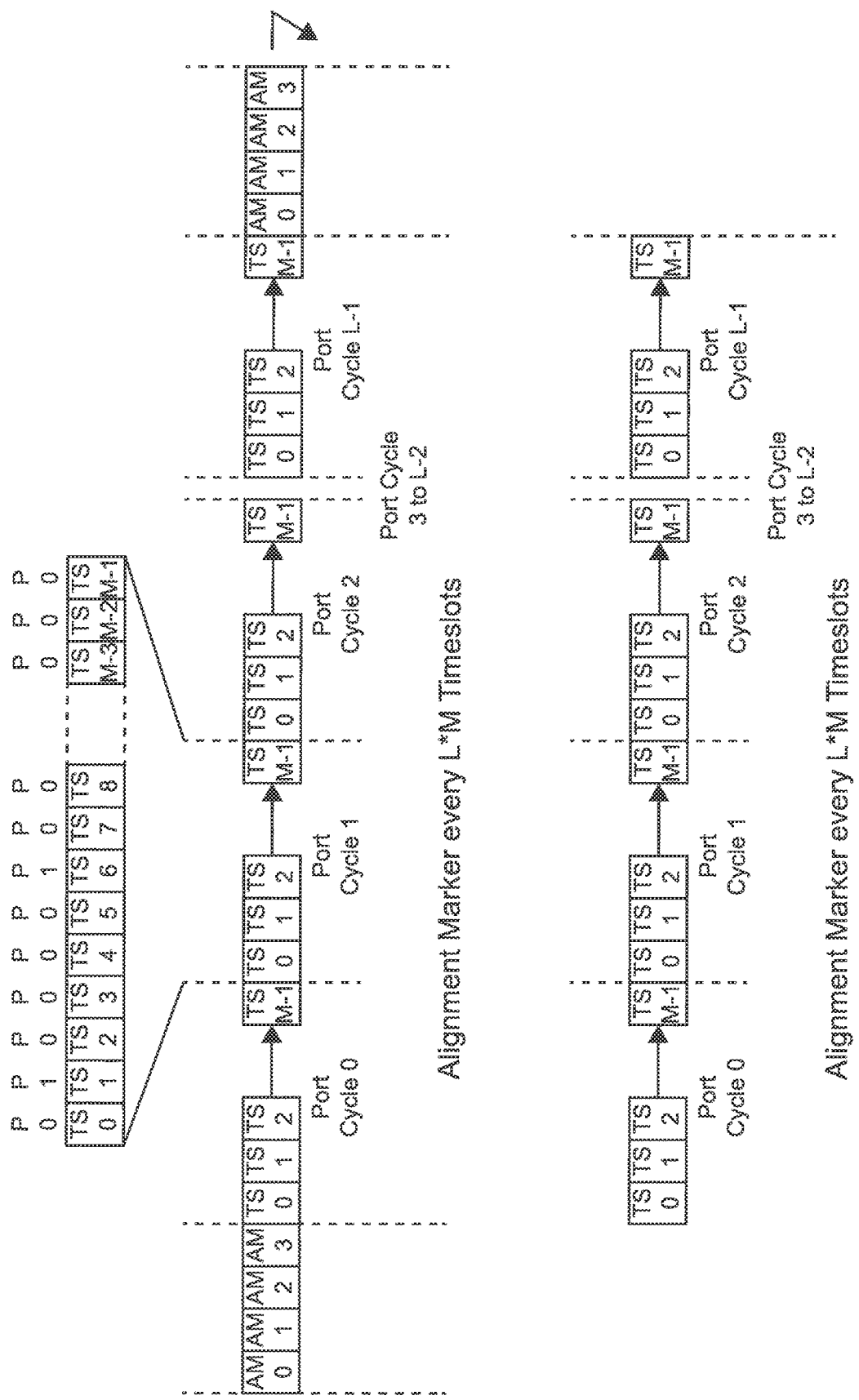
FIG. 5 shows a schematic diagram of a frame format for multi-port communication with a weighted round-robin scheme.

An exemplary frame format is shown in FIG. 5. Each port cycle comprises time-slots 0 to M−1. In the example of FIG. 5, an example is shown for 5 ports, with Port 0 being 5 times as fast as Port 1 (e.g. Port 0 being a 5 G port, and Port 1 being a 1 G port). Each port cycle comprises a sequence of time-slots being assigned in a weighted round-robin fashion according to the data rate of the ports. In FIG. 5, the sequence P0 P1 P0 P0 P0 is chosen and repeated within the port cycle. Again, an AM may be inserted every L*M time slots. In FIG. 5, four AM slots AM0 to AM3 are used.

In the following an exemplary calculation of the number of time slots per port cycle is shown. The number of time slot for port n (from 0 to N−1) is Kn. The total number of time slots for all ports in a port cycle is $M=\Sigma_{n=0}^{N-1} Kn$. The time slots assignment for a port according to an example is proposed in the following. For example, a port with a rate of 1 Gbps may be assigned 2 time slots in one port cycle. A port with a rate of 2.5 Gbps may be assigned 5 time slots in one port cycle. A port with a rate of 5 Gbps may be assigned 10 time slots in one port cycle. A port with a rate of 10 Gbps may be assigned 20 time slots in one port cycle. In order to avoid complexity, a port with 10 Mbps or 100 Mbp may be adapted to 1 Gbps by replication as defined in UXGMII-M.

If the number of time slots (TS) of all ports have a common factor, then the number of slots for any port may be divided by the common factor to simplify it. For example, if there is only 1 Gbps and 10 Gbps ports, 1 time slot may be used for 1 Gbps and 10 time slots may be used for 10 Gbps (or 5 time slots/1 time slot, as shown in FIG. 5).

In some examples, a weighted round-robin mechanism may be used. The mechanism may enable that the time slots assigned for one port are evenly spread in the weighted round-robin list. A corresponding algorithm is proposed as shown in FIG. 6.

The algorithm starts with block 610. In block 620, ts_index, ts_alloc[N−1:0] and port_index are initialized to be 0. ts_index is the index of time slot in a port cycle; port_index is the index of the port; ts_alloc is an array of N ports, it stores the number of time slots already allocated. If ts_index<M, then the algorithm terminates with block 670, if >=M it continues and compares port_index with N. If port_index>=N, then port_index is set to 0, if it is smaller, then port_index remains its values. Subsequently, ts_alloc [port_index] is compared with 0. If ts_alloc[port_index] is 0, then the algorithm continues with block 650, if not, floor ((ts_index-port_index)/ts_alloc[port_index]) is compared with floor(M/Kn). If floor((ts_index-port_index)/ts_alloc [port_index])>=floor(M/Kn), then the algorithm continues with block 650, if not, the algorithm continues with block 640 and increments the port_index and goes back to the comparison between port_index and N. In block 650, the port of port_index is allocated for the current time slot, and the algorithm continues with block 660. In block 660, ts_alloc[port_index], ts_index and port_index are incremented. Subsequently, the algorithm returns to the comparison between ts_index and M.

The algorithm determines the port sequence in a port cycle. The port sequence might not be dynamically changed, thus the port sequence in hardware may be configured with a predetermined sequence.

In the following, some examples are given. In a first example, five ports with 2.5 G, 2.5 G, 2.5 G, 2.5 G and 2.5 Gbps are used. There are 5 time slots in a port cycle. The port sequence in a port cycle is P0, P1, P2, P3, P4. In a second example, 5 ports with 2.5 G, 2.5 G, 2.5 G, 2.5 G and 1 Gbps are used. In this case, there are 22 time slots in a port cycle. The port sequence in a port cycle is P0, P1, P2, P3, P4, P0, P1, P2, P3, P0, P1, P2, P3, P0, P1, P2, P3, P4, P0, P1, P2, P3. In a third example, 2 ports with 10 G and 2.5 G are used. In this case, there are 5 time slots in a port cycle. The port sequence in a port cycle is P0, P1, P0, P0, P0 (e.g. as shown in FIG. 5).

The aspects or examples for proposed concept can be used in products (Ethernet PHY, Ethernet Switch, Router/Gateway SoC in order to achieve the advantages (optimized cost and optimized power consumption) mentioned in the present disclosure.

Figure 7:
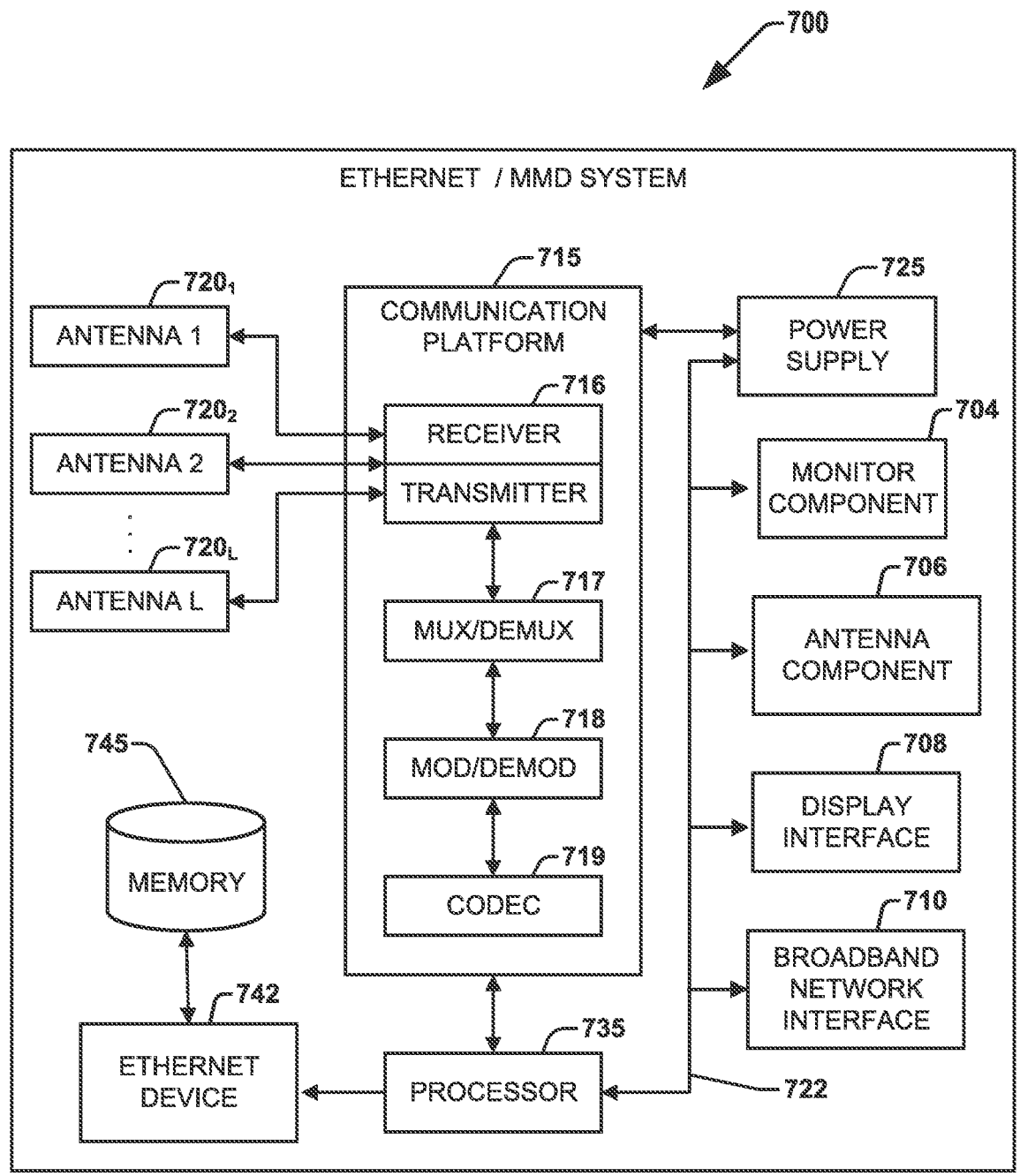
FIG. 7 shows an example of a computing system.

In order to provide context for various aspects of the disclosed subject matter, FIG. 7 illustrates a non-limiting example of a computing system, such as a gateway network device (e.g., an Management Data Input/Output (MDIO)-management (MMD) device communicatively coupled to an Ethernet device) 700 that can implement some or all of the aspects/components described herein. For example, the computer system/gateway network device 700 may comprise one or more transmitter apparatuses/devices and one or more receiver apparatuses/devices as shown in connection with the previous figures. For example, the computer system/gateway network device 700 may be a networking device as previously introduced. An MMD device can be referred to as a wired bus (e.g., a two wire serial bus or the like) with a physical (PHY) layer or physical layer devices operably coupled to a media access controller (MACs) with Gigabit equipment, for example, in compliance with IEEE 802.3 and configured to access up 72 different PHY devices/MMD devices.

In an example environment, a terminal 700, such as data terminal equipment, a laptop, tablet, other communication device, can receive and transmit signal(s) to and/or from devices such as access points, access terminals, wireless ports and routers, as well or the like, through an interface 722.

The PHY devices can comprise one or more other components also such as a set of L antennas 720. In one example, antennas 720 can be implemented as part of a communication platform 715, which in turn can comprise electronic components and associated circuitry and/or other means that provide for processing and manipulation of received signal(s) and signal(s) to be transmitted between. The antennas 720 can comprise the various antenna elements incorporating the different aspects or examples disclosed herein.

In an aspect, communication platform 715 can include various other components such as a monitor component 704 and antenna component 706, which can couple to communication platform 715 and include electronic components with associated circuitry that provide for processing and manipulation of received signal(s) and other signal(s) to be transmitted or received, including a Serdes component. For example, the communication platform 715 may comprise a transmitter apparatus/device and/or receiver apparatus or device. The communication platform 715 can further comprise a receiver/transmitter or transceiver 716, which can transmit and receive signals and/or perform one or more processing operations on such signals (e.g., conversion from analog to digital upon reception, conversion from digital to analog upon transmission, etc.). In addition, transceiver 716 can divide a single data stream into multiple, parallel data streams, or perform the reciprocal operation.

The communication device 700 can also include a display interface 708, which can display functions that control functionality of the device 700, or reveal operation conditions thereof. In addition, display interface 708 can include a screen to convey information to an end user. In an aspect, display interface 708 can be a liquid crystal display, a plasma panel, a monolithic thin-film based electro chromic display, and so on. Moreover, display interface 708 can include a component (e.g., speaker) that facilitates communication of aural indicia, which can also be employed in connection with messages that convey operational instructions to an end user. Display interface 708 can also facilitate data entry (e.g., through a linked keypad or through touch gestures), which can cause access equipment and/or software 700 to receive external commands (e.g., restart operation).

Broadband network interface 720 facilitates connection of access equipment and/or software 700 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 710 can be internal or external to access equipment and/or software 700, and can utilize display interface 708 for end-user interaction and status information delivery.

Processor 735 can be functionally connected to communication platform 708 (as the DPU 710) and can facilitate operations on data (e.g., symbols, bits, or chips) for multiplexing/de-multiplexing, such as effecting direct and inverse fast Fourier transforms, selection of modulation rates, selection of data packet formats, inter-packet times, and so on. Moreover, processor 735 can be functionally connected, through data, system, or an address bus, to display interface 708 and broadband network interface 710, to confer, at least in part, functionality to each of such components.

In another example, a multiplexer/de-multiplexer (mux/demux) unit 717 can be coupled to transceiver 716. Mux/demux unit 717 can, for example, facilitate manipulation of signal in time and frequency space. Additionally or alternatively, mux/demux unit 717 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 717 can scramble and spread information according to substantially any code generally known in the art, such as Hadamard-Walsh codes, Baker codes, Kasami codes, polyphase codes, and so on.

In a further example, a modulator/demodulator (mod/demod) unit 718 implemented within communication platform 715 can modulate information according to multiple modulation techniques, such as frequency modulation, amplitude modulation (e.g., L-ary quadrature amplitude modulation (L-QAM), etc.), phase-shift keying (PSK), or other modulation operations. Further, communication platform 715 can also include a coder/decoder (codec) module (component) 719 that facilitates decoding received signal(s) and/or coding signal(s) or a Serdes component to convey or communicate between devices, such as an Ethernet device 742 via an Ethernet cable interface or other interface.

According to another aspect, terminal 700 can include a processor 735 configured to confer functionality, at least in part, to substantially any electronic component utilized by terminal 700. As further shown in system 700, a power supply 725 can attach to a power grid and include one or more transformers to achieve a power level at which various components and/or circuitry associated with terminal 700 can operate. In one example, power supply 725 can include a rechargeable power mechanism to facilitate continued operation of terminal 700 in the event that the terminal 700 is disconnected from the power grid, the power grid is not operating, etc. The antennas, for example, with the other antenna element configurations can further facilitate communications with a wireless charging of the power supply 725, such as with a transfer of energy from the antenna system to the power supply 725 via an oscillating magnetic field, for example.

In a further aspect, processor 735 can be functionally connected to communication platform 715 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 735 can be functionally connected, via a data or system bus (e.g., a wireless PCIE or the like), to any other components or circuitry not shown in system 700 to at least partially confer functionality to each of such components, such as by the antenna systems disclosed herein.

As additionally illustrated, a memory 745 can be used by terminal 700 to store data structures, code instructions and program modules, system or device information, code sequences for scrambling, spreading and pilot transmission, location intelligence storage, determined delay offset(s), over-the-air propagation models, and so on. Memory 745 can also include one or more registers. Processor 735 can be coupled to the memory 745 in order to store and retrieve information necessary to operate and/or confer functionality to communication platform 715 and/or any other components of terminal 700. An Ethernet device 742 can operate to communicate between the various components 704-335 as separate MMD device, external MMD devices, or both separate and external MMD devices.

Figure 8:
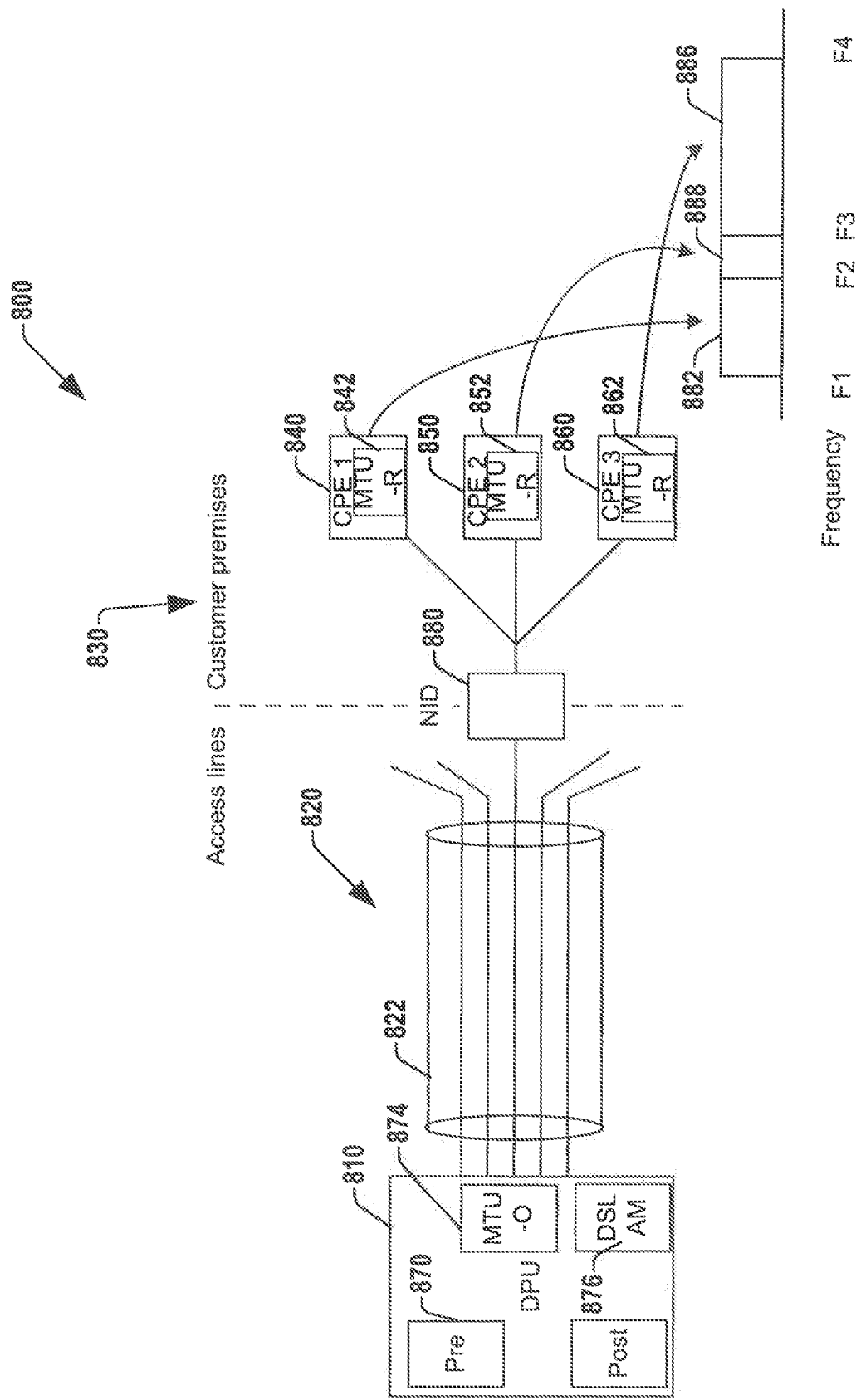
FIG. 8 shows an example of a vector transmission system.

Referring now to FIG. 8, illustrated is an exemplary example of a vector transmission system 800 that in part, or whole, can be utilized in accordance with various examples herein.

An access line 820 coming from a digital processing unit (DPU) 810 splits at a customer premise 830, and is connected to one or more CPEs 840, 850, or 860 (e.g., a home gateway, router, user equipment, internet of things (IoT) device, or the like), which are not necessarily limited to any specific number herein. For example, the DPU 810 and/or the one or more CPEs 840-860 may (each) comprise one or more transmitter apparatuses/devices and/or one or more receiver apparatuses/devices. The DPU 810 feeds a number of premises and crosstalk operations (e.g., far-end cross talk (FEXT), or the like), where crosstalk between the lines sourced from the DPU 810 is cancelled by a pre-coder component 870 and a post-coder component 872 that is integrated in, comprised by, or communicatively coupled to the DPU 810. The DPU 810 can also include one or more processors, represent one or more processors, controllers or microcontrollers of a network device or circuitry, or other component for enabling one or more aspects of examples herein.

The access line 820 connects the CPEs 840 thru 860 with a single twisted pair 822 having direct lines corresponding to each CPE 840-860 through (via) a network interconnect/interface device (NID) 880. A Serdes device as described herein according to one or more examples can also be coupled to or integrated herein.

Transceiver(s) (Tx) 874 of the DPU 810 serving the access line 820 can be further denoted as MTU-O for the operating side, and the transceivers 842, 852, 862 of CPEs 840, 850, 860, respectively, can be denoted as a MTU-R (e.g., as an MGFAST technology) for the receiver side at a CPE.

Each of the CPEs 840-860 can utilize a particular set of frequencies (882, 884, 886), which for simplicity are shown in FIG. 8 as three, non-overlapped, parts of frequency spectrum from F1 to F2, F2 to F3, and F3 to F4. With various examples herein, the sets of frequencies used by each CPE can be any. With multi-carrier modulation, like Discrete Multi-Tone (DMT) or Orthogonal Frequency Division Multiplexing (OFDM), each set of frequencies 882, 884, 886 can be a set to tones (also called carriers or subcarriers).

A main characteristic function of the vector transmission system 800 is to utilize crosstalk cancellation (vectoring) between lines of a twisted pair as the access line 820 sourced from the DPU 810. Various aspects or examples described herein support full duplex (FDX) operation, in which local echo can be cancelled in the DPU 810 and in each CPE 840, 850, 860, and Near-End Crosstalk (NEXT) is cancelled in the DPU 810 and mitigated in the CPEs 840-460 at the customer premises.

NEXT, as referred to herein, can be an error condition that can occur when connectors are attached to twisted pair cabling. NEXT can be caused by crossed or crushed wire pairs, which can cause an error condition in transmission. It can also occur when a strong signal on one pair of wires is picked up by an adjacent pair of wires, resulting in a portion of a transmitted signal being electromagnetically coupled back into the received signal.

The vector transmission system 800 can also comprise other components (not shown) that are a part of or operable coupled to the vectoring transmission system 800. In one example, a Digital Subscriber Line Access Multiplexer (DSLAM) 876 can operate to combine a plurality of transceivers 874 at the DPU 810, which can also be coupled to a plurality of lines of the access line 820. Each of the lines of the plurality of lines may for example be implemented as a twisted pair wire as the access line 820, which can further be implemented in an Optical Network Unit (ONU) such as a Central Office (CO), a cabinet, an exchange or other types of network termination devices at the operator's end.

Each of the plurality of lines 822 of access line 820 can connect one or more transceivers 874 at the operator's end with a respective second transceiver unit 808 at a subscriber or CPE receiver end, which can be at different distances with respect to one another. The DPU 810 can comprise or operate as a management entity to provide management functions such as spectrum management and coordination functionality for transmitting signals or other signal communication operations according to various examples/aspects described herein. As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some examples, the circuitry can be implemented in, or functions associated with the circuitry can be implemented by, one or more software or firmware modules. In some examples, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/examples herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to examples and examples described herein.

Examples can include an apparatus comprising means to perform one or more elements of a method described in or related to any of examples (examples) above, or any other method or process described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated examples of the subject disclosure, including what is described in the Abstract, is not intended to be exhaustive or to limit the disclosed examples to the precise forms disclosed. While specific examples and examples are described herein for illustrative purposes, various modifications are possible that are considered within the scope of such examples and examples, as those skilled in the relevant art can recognize.

In this regard, while the disclosed subject matter has been described in connection with various examples and corresponding Figures, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application Example 1 relates to a transmitter apparatus (10) for a source device (100), the transmitter apparatus comprising a plurality of ports (12) for data to be transmitted to a destination device (200), with each port being associated with a transmission data rate. The transmitter apparatus (10) comprises processing circuitry (14) configured to obtain data to be transmitted to the destination device via the plurality of ports, multiplex the data to be transmitted to the destination device according to a weighted round-robin scheme to generate a multiplexed data stream, wherein the weights of the weighted round-robin scheme are based on the transmission data rate of the respective port the data is obtained over, and transmit the multiplexed data stream to the destination device.

In Example 2, the subject matter of example 1 or any of the Examples described herein may further include, that the processing circuitry is configured to multiplex the data to be transmitted into a plurality of time slots of the multiplexed data stream.

In Example 3, the subject matter of example 2 or any of the Examples described herein may further include, that regardless of the number of ports, each time slot of the plurality of time slots is assigned to one of the plurality of ports.

In Example 4, the subject matter of one of the examples 2 to 3 or any of the Examples described herein may further include, that the processing circuitry is configured to multiplex the data to be transmitted into the plurality of time slots based on the weighted round-robin scheme, such that the data is multiplexed into the plurality of time slots according to the weighted round-robin scheme.

In Example 5, the subject matter of example 4 or any of the Examples described herein may further include, that a number of slots reserved for a port within a cycle of the weighted round-robin scheme is proportional to the weighting of the respective port in the weighted round-robin scheme.

In Example 6, the subject matter of example 5 or any of the Examples described herein may further include, that a number of time slots within a cycle of the weighted round-robin scheme is not limited to the power of two.

In Example 7, the subject matter of one of the examples 5 to 6 or any of the Examples described herein may further include, that the processing circuitry is configured to insert alignment markers into the multiplexed data stream after a pre-defined number of cycles of the weighted round-robin scheme.

In Example 8, the subject matter of one of the examples 1 to 7 or any of the Examples described herein may further include, that the weights of the weighted round-robin scheme are proportional to the transmission data rates of the plurality of ports.

In Example 9, the subject matter of one of the examples 1 to 8 or any of the Examples described herein may further include, that the processing circuitry is configured to support configurations with a number of ports that is unequal to a power of two.

In Example 10, the subject matter of one of the examples 1 to 9 or any of the Examples described herein may further include, that the plurality of ports comprise at least a first subset of ports having a first transmission data rate and a second subset of ports having a second transmission data rate.

In Example 11, the subject matter of one of the examples 1 to 10 or any of the Examples described herein may further include, that the data to be transmitted to the destination device is 64/66b encoded data.

In Example 12, the subject matter of one of the examples 1 to 11 or any of the Examples described herein may further include, that the transmitter apparatus comprises a serializer-deserializer (16), wherein the processing circuitry is configured to transmit the multiplexed data stream to the destination device via the serializer-deserializer.

In Example 13, the subject matter of example 12 or any of the Examples described herein may further include, that an overall data rate of the serializer-deserializer is a sum of the transmission data rates of the individual ports.

In Example 14, the subject matter of one of the examples 1 to 13 or any of the Examples described herein may further include, that the processing circuitry is configured to transmit the multiplexed data stream to the destination via a single line or a differential pair of lines.

Example 15 relates to a source device (100) comprising the transmitter apparatus (10) according to one of the examples 1 to 14.

Example 16 relates to a receiver apparatus (20) for a destination device, the receiver apparatus comprising a plurality of ports (22) for outputting data that is transmitted to the destination device from a source device, with each port being associated with a transmission data rate. The receiver apparatus (20) comprises processing circuitry (24) configured to de-multiplex a multiplexed data stream that is received by the receiver apparatus from the source device, wherein the multiplexed data stream is multiplexed according to a weighted round-robin scheme, wherein the weights of the weighted round-robin scheme are based on the transmission data rate of the respective port the data is destined for, and output the de-multiplexed data over the corresponding port of the plurality of ports.

In Example 17, the subject matter of example 16 or any of the Examples described herein may further include, that the receiver apparatus comprises a serializer-deserializer (26), wherein the processing circuitry is configured to receive the multiplexed data stream from the source device via the serializer-deserializer.

Example 18 relates to a destination device (200) comprising the receiver apparatus (20) according to one of the examples 16 or 17.

Example 19 relates to a networking device (1000) comprising the source device (100) according to example 15 and the destination device (200) according to example 18, wherein the transmitter apparatus of the source device and the receiver apparatus of the destination device are configured to connect the source device and the destination device within the networking device.

In Example 20, the subject matter of example 19 or any of the Examples described herein may further include, that the networking device is one of a gateway, a router or an ethernet switch.

Example 21 relates to a transmitter device (10) for a source device (100), the transmitter device comprising a plurality of ports (12) for data to be transmitted to a destination device (200), with each port being associated with a transmission data rate. The transmitter device (10) comprises means for processing (14) configured to obtain data to be transmitted to the destination device via the plurality of ports, multiplex the data to be transmitted to the destination device according to a weighted round-robin scheme to generate a multiplexed data stream, wherein the weights of the weighted round-robin scheme are based on the transmission data rate of the respective port the data is obtained over, and transmit the multiplexed data stream to the destination device.

In Example 22, the subject matter of example 21 or any of the Examples described herein may further include, that the means for processing is configured to multiplex the data to be transmitted into a plurality of time slots of the multiplexed data stream.

In Example 23, the subject matter of example 22 or any of the Examples described herein may further include, that regardless of the number of ports, each time slot of the plurality of time slots is assigned to one of the plurality of ports.

In Example 24, the subject matter of one of the examples 22 to 23 or any of the Examples described herein may further include, that the means for processing is configured to multiplex the data to be transmitted into the plurality of time slots based on the weighted round-robin scheme, such that the data is multiplexed into the plurality of time slots according to the weighted round-robin scheme.

In Example 25, the subject matter of example 24 or any of the Examples described herein may further include, that a number of slots reserved for a port within a cycle of the weighted round-robin scheme is proportional to the weighting of the respective port in the weighted round-robin scheme.

In Example 26, the subject matter of example 25 or any of the Examples described herein may further include, that a number of time slots within a cycle of the weighted round-robin scheme is not limited to the power of two.

In Example 27, the subject matter of one of the examples 25 to 26 or any of the Examples described herein may further include, that the means for processing is configured to insert alignment markers into the multiplexed data stream after a pre-defined number of cycles of the weighted round-robin scheme.

In Example 28, the subject matter of one of the examples 21 to 27 or any of the Examples described herein may further include, that the weights of the weighted round-robin scheme are proportional to the transmission data rates of the plurality of ports.

In Example 29, the subject matter of one of the examples 21 to 28 or any of the Examples described herein may further include, that the means for processing is configured to support configurations with a number of ports that is unequal to a power of two.

In Example 30, the subject matter of one of the examples 21 to 29 or any of the Examples described herein may further include, that the plurality of ports comprise at least a first subset of ports having a first transmission data rate and a second subset of ports having a second transmission data rate.

In Example 31, the subject matter of one of the examples 21 to 30 or any of the Examples described herein may further include, that the data to be transmitted to the destination device is 64/66b encoded data.

In Example 32, the subject matter of one of the examples 21 to 31 or any of the Examples described herein may further include, that the transmitter device comprises a means for serializing and deserializing (16), wherein the means for processing is configured to transmit the multiplexed data stream to the destination device via the means for serializing and deserializing.

In Example 33, the subject matter of example 32 or any of the Examples described herein may further include, that an overall data rate of the means for serializing and deserializing is a sum of the transmission data rates of the individual ports.

In Example 34, the subject matter of one of the examples 21 to 33 or any of the Examples described herein may further include, that the means for processing is configured to transmit the multiplexed data stream to the destination via a single line or a differential pair of lines.

Example 35 relates to a source device (100) comprising the transmitter device (10) according to one of the examples 21 to 34.

Example 36 relates to a receiver device (20) for a destination device (200), the receiver device comprising a plurality of ports (22) for outputting data that is transmitted to the destination device from a source device, with each port being associated with a transmission data rate. The receiver device (20) comprises means for processing (24) configured to de-multiplex a multiplexed data stream that is received by the receiver device from the source device, wherein the multiplexed data stream is multiplexed according to a weighted round-robin scheme, wherein the weights of the weighted round-robin scheme are based on the transmission data rate of the respective port the data is destined for, and output the de-multiplexed data over the corresponding port of the plurality of ports.

In Example 37, the subject matter of example 36 or any of the Examples described herein may further include, that the receiver device comprises a means for serializing and deserializing (26), wherein the means for processing is configured to receive the multiplexed data stream from the source device via the serializer-deserializer.

Example 38 relates to a destination device (200) comprising the receiver device (20) according to one of the examples 36 or 37.

Example 39 relates to a networking device (1000) comprising the source device (100) according to example 35 and the destination device (200) according to example 38, wherein the transmitter device of the source device and the receiver device of the destination device are configured to connect the source device and the destination device within the networking device.

In Example 40, the subject matter of example 39 or any of the Examples described herein may further include, that the networking device is one of a gateway, a router or an ethernet switch.

Example 41 relates to a transmitter method for a source device (100), the transmitter method comprising obtaining (110) data to be transmitted to a destination device via a plurality of ports, with each port being associated with a transmission data rate, multiplexing (120) the data to be transmitted to the destination device according to a weighted round-robin scheme to generate a multiplexed data stream, wherein the weights of the weighted round-robin scheme are based on the transmission data rate of the respective port the data is obtained over, and transmitting (130) the multiplexed data stream to the destination device.

In Example 42, the subject matter of example 41 or any of the Examples described herein may further include, that the method comprises multiplexing the data to be transmitted into a plurality of time slots of the multiplexed data stream.

In Example 43, the subject matter of example 42 or any of the Examples described herein may further include, that regardless of the number of ports, each time slot of the plurality of time slots is assigned to one of the plurality of ports.

In Example 44, the subject matter of one of the examples 42 to 43 or any of the Examples described herein may further include, that the method comprises multiplexing the data to be transmitted into the plurality of time slots based on the weighted round-robin scheme, such that the data is multiplexed into the plurality of time slots according to the weighted round-robin scheme.

In Example 45, the subject matter of example 44 or any of the Examples described herein may further include, that a number of slots reserved for a port within a cycle of the weighted round-robin scheme is proportional to the weighting of the respective port in the weighted round-robin scheme.

In Example 46, the subject matter of example 45 or any of the Examples described herein may further include, that a number of time slots within a cycle of the weighted round-robin scheme is not limited to the power of two.

In Example 47, the subject matter of one of the examples 45 to 46 or any of the Examples described herein may further include, that the method comprises inserting (125) alignment markers into the multiplexed data stream after a pre-defined number of cycles of the weighted round-robin scheme.

In Example 48, the subject matter of one of the examples 41 to 47 or any of the Examples described herein may further include, that the weights of the weighted round-robin scheme are proportional to the transmission data rates of the plurality of ports.

In Example 49, the subject matter of one of the examples 41 to 48 or any of the Examples described herein may further include, that the method supports configurations with a number of ports that is unequal to a power of two.

In Example 50, the subject matter of one of the examples 41 to 49 or any of the Examples described herein may further include, that the plurality of ports comprise at least a first subset of ports having a first transmission data rate and a second subset of ports having a second transmission data rate.

In Example 51, the subject matter of one of the examples 41 to 50 or any of the Examples described herein may further include, that the data to be transmitted to the destination device is 64/66b encoded data.

In Example 52, the subject matter of one of the examples 41 to 51 or any of the Examples described herein may further include, that the method comprises transmitting the multiplexed data stream to the destination device via a serializer-deserializer.

In Example 53, the subject matter of example 52 or any of the Examples described herein may further include, that an overall data rate of the serializer-deserializer is a sum of the transmission data rates of the individual ports.

In Example 54, the subject matter of one of the examples 41 to 53 or any of the Examples described herein may further include, that the method comprises transmitting the multiplexed data stream to the destination via a single line or a differential pair of lines.

Example 55 relates to a source device (100) being configured to perform transmitter method according to one of the examples 41 to 54.

Example 56 relates to a receiver method for a destination device, the receiver method comprising de-multiplexing (210) a multiplexed data stream that is received by the destination device from a source device, wherein the multiplexed data stream is multiplexed according to a weighted round-robin scheme, wherein the weights of the weighted round-robin scheme are based on the transmission data rate of a respective port of a plurality of ports the data is destined for, with each port being associated with a transmission data rate, and outputting (220) the de-multiplexed data over the corresponding port of the plurality of ports.

In Example 57, the subject matter of example 56 or any of the Examples described herein may further include, that the method comprises receiving the multiplexed data stream from the source device via a serializer-deserializer.

Example 58 relates to a destination device (200) being configured to perform the receiver method according to one of the examples 56 or 57.

Example 59 relates to a networking device (1000) comprising the source device (100) according to example 55 and the destination device (200) according to example 58, wherein the transmitter method of the source device and the receiver method of the destination device are used to connect the source device and the destination device within the networking device.

In Example 60, the subject matter of example 59 or any of the Examples described herein may further include, that the networking device is one of a gateway, a router or an ethernet switch.

Example 61 relates to a machine-readable storage medium including program code, when executed, to cause a machine to perform the method of one of the examples 41 to 54, or the method of one of the examples 56 or 57.

Example 62 relates to a computer program having a program code for performing the method of one of the examples 41 to 54, or the method of one of the examples 56 or 57, when the computer program is executed on a computer, a processor, or a programmable hardware component.

Example 63 relates to a machine-readable storage including machine readable instructions, when executed, to implement a method or realize an apparatus as claimed in any pending claim or shown in any example.

Example A1 relates to an apparatus employed in serializer-deserializer (serdes) of a network interface. The apparatus comprises processing circuitry configured to support multiple ports with a number of ports up to or more than a power of 2, enabling one or more of the multiple ports have a different baud rate from one another by multiplexing one or more 64/66b encoded blocks of each network port in a weighted round-robin process and scrambling a resulting multiplexed stream.

In Example A2, the Example of A1 may further comprise, that the processing circuitry is further configured to convert data between serial data and parallel interfaces in each direction of different directions to provide a transmission over a single line or a differential pair of lines.

In Example A3, the Example of A1 or A2 may further comprise, that the processing circuitry is configured to weight the weighted round-robin process based on a proportion of a port rate for a weighted round-robin multiplexing of streams to generate the resulting multiplexed stream.

In Example A4, the Example of A3 may further comprise, that a total number of time slots for all network ports are different from a power of two, as more or less, and are not limited to the power of two.

In Example A5, the Example of one of the Examples A1 to A4 may further comprise a port Mux/De-Mux logic that operates on 64/66b encoded blocks, and an alignment marker configured to be inserted to identify Port Cycle 0 and a start of a weighted round-robin sequence.

In Example A6, the Example of one of the Examples A1 to A5 may further comprise, that a baud rate of each port of a plurality of ports as the multiple ports are different from one another.

In Example A7, the Example of one of the Examples A1 to A6 may further comprise, that the processing circuitry is further configured to enable five ports with 2.5 Gbps each in the serdes with a 12.5 Gbps bandwidth, or two ports comprising one with 10 Gbps and another with 2.4 Gbps in the serdes with 12.5 Gbps bandwidth.

In Example A8, the Example of one of the Examples A1 to A7 may further comprise the multiple ports configured to be multiplexes, wherein the serdes comprises a rate that is a sum of the rates of the multiple ports, and each port having a different rate.

In Example A9, the Example of one of the Examples A1 to A8 may further comprise, that the processing circuitry is further configured to create time slots according to the number of N ports and a port rate of each port, assign the time slots for a port as a proportion to the port rate.

In Example A10, the Example of Example A9 may further comprise, that each time slot sends a 64-bit encoded block in a weighted round-robin scheme, and wherein each time slot is assigned for one port that is evenly spread in a weighted round-robin list.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A transmitter apparatus for a source device, the transmitter apparatus comprising:
   a plurality of ports for data to be transmitted to a destination device, with each port being associated with a transmission data rate; and
   processing circuitry configured to:
   obtain data to be transmitted to the destination device via the plurality of ports,
   multiplex the data to be transmitted to the destination device according to a weighted round-robin scheme to generate a multiplexed data stream,
   wherein the weights of the weighted round-robin scheme are determined based on the transmission data rate of the respective port,
   wherein the weights of the weighted round-robin scheme are proportional to the transmission data rates of the plurality of ports, and
   transmit the multiplexed data stream directly to the destination device via a single serializer-deserializer.

2. The transmitter apparatus according to claim 1, wherein the processing circuitry is configured to multiplex the data to be transmitted into a plurality of time slots of the multiplexed data stream.

3. The transmitter apparatus according to claim 2, wherein, regardless of the number of ports, each time slot of the plurality of time slots is assigned to one of the plurality of ports.

4. The transmitter apparatus according to claim 2, wherein the processing circuitry is configured to multiplex the data to be transmitted into the plurality of time slots based on the weighted round-robin scheme, such that the data is multiplexed into the plurality of time slots according to the weighted round-robin scheme.

5. The transmitter apparatus according to claim 4, wherein a number of slots reserved for a port within a cycle of the weighted round-robin scheme is proportional to the weighting of the respective port in the weighted round-robin scheme.

6. The transmitter apparatus according to claim 5, wherein a number of time slots with-in a cycle of the weighted round-robin scheme is not limited to the power of two.

7. The transmitter apparatus according to claim 5, wherein the processing circuitry is configured to insert alignment markers into the multiplexed data stream after a pre-defined number of cycles of the weighted round-robin scheme.

8. The transmitter apparatus according to claim 1 wherein the processing circuitry is configured to support configurations with a number of ports that is unequal to a power of two.

9. The transmitter apparatus according to claim 1, wherein the plurality of ports comprise at least a first subset of ports having a first transmission data rate and a second subset of ports having a second transmission data rate.

10. The transmitter apparatus according to claim 1, wherein the data to be transmitted to the destination device is 64/66b encoded data.

11. The transmitter apparatus according to claim 1, wherein an overall data rate of the serializer-deserializer is a sum of the transmission data rates of the individual ports.

12. The transmitter apparatus according to claim 1, wherein the processing circuitry is configured to transmit the multiplexed data stream to the destination via a single line or a differential pair of lines.

13. A source device comprising the transmitter apparatus according to claim 1.

14. A transmitter device for a source device, the transmitter device comprising:
    a plurality of ports for data to be transmitted to a destination device, with each port being associated with a transmission data rate; and
    means for processing configured to:
    obtain data to be transmitted to the destination device via the plurality of ports,
    multiplex the data to be transmitted to the destination device according to a weighted round-robin scheme to generate a multiplexed data stream, wherein the weights of the weighted round-robin scheme are based on the transmission data rate of the respective port the data is obtained over, wherein the weights of the weighted round-robin scheme are proportional to the transmission data rates of the plurality of ports, and
    transmit the multiplexed data stream directly to the destination device via a single serializer-deserializer.

15. A transmitter method for a source device, the transmitter method comprising:
    obtaining data to be transmitted to a destination device via a plurality of ports, with each port being associated with a transmission data rate,
    multiplexing the data to be transmitted to the destination device according to a weighted round-robin scheme to generate a multiplexed data stream,
    wherein the weights of the weighted round-robin scheme are based on the transmission data rate of the respective port the data is obtained over, and
    wherein the weights of the weighted round-robin scheme are proportional to the transmission data rates of the plurality of ports, and
    transmitting the multiplexed data stream to the destination device via a single serializer-deserializer.

* * * * *